(12) United States Patent
Taherzadeh Boroujeni et al.

(10) Patent No.: US 12,063,661 B2
(45) Date of Patent: Aug. 13, 2024

(54) COMPACT DOWNLINK CONTROL INFORMATION WITH PRECONFIGURED SCHEDULING PARAMETERS

(71) Applicant: QUALCOMM Incorporated, San Diego, CA (US)

(72) Inventors: Mahmoud Taherzadeh Boroujeni, San Diego, CA (US); Junyi Li, Fairless Hills, PA (US); Tao Luo, San Diego, CA (US)

( * ) Notice: Subject to any disclaimer, the term of this patent is extended or adjusted under 35 U.S.C. 154(b) by 163 days.

(21) Appl. No.: 17/707,259

(22) Filed: Mar. 29, 2022

(65) Prior Publication Data

US 2023/0319832 A1 Oct. 5, 2023

(51) Int. Cl.
  *H04W 72/23* (2023.01)
  *H04L 5/00* (2006.01)

(52) U.S. Cl.
  CPC ........... *H04W 72/23* (2023.01); *H04L 5/0053* (2013.01)

(58) Field of Classification Search
  CPC ... H04W 72/23; H04W 28/06; H04W 72/232; H04L 5/0053
  See application file for complete search history.

(56) References Cited

U.S. PATENT DOCUMENTS

| | | | |
|---|---|---|---|
| 2012/0275395 A1 | 11/2012 | Gerstenberger et al. | |
| 2019/0239187 A1* | 8/2019 | Islam | H04L 5/0048 |
| 2019/0313385 A1* | 10/2019 | Yang | H04L 1/08 |
| 2019/0363843 A1* | 11/2019 | Gordaychik | H04L 1/08 |
| 2021/0075537 A1 | 3/2021 | Fröberg et al. | |
| 2023/0413281 A1* | 12/2023 | Park | H04W 72/11 |

FOREIGN PATENT DOCUMENTS

WO  2021142760 A1  7/2021

OTHER PUBLICATIONS

International Search Report and Written Opinion—PCT/US2023/063966—ISA/EPO—May 22, 2023.

* cited by examiner

*Primary Examiner* — Jamal Javaid
*Assistant Examiner* — Ryan C Kavleski

(57) ABSTRACT

Certain aspects of the present disclosure provide a method for wireless communications by a user equipment (UE). The method generally includes receiving, from a network entity, downlink control information (DCI) that includes a first field that indicates a preconfigured option for interpreting at least a second field associated with the DCI, interpreting at least the second field in accordance with the preconfigured option indicated by the first field, and communicating with the network entity in accordance with the interpretation of the second field.

26 Claims, 11 Drawing Sheets

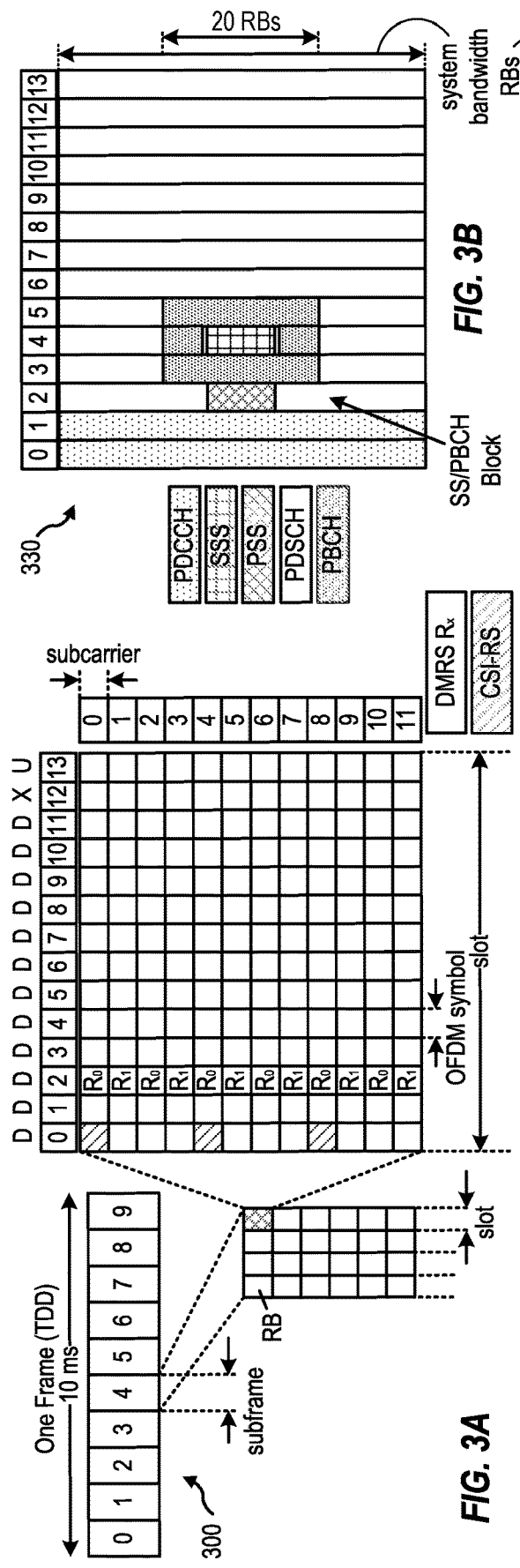
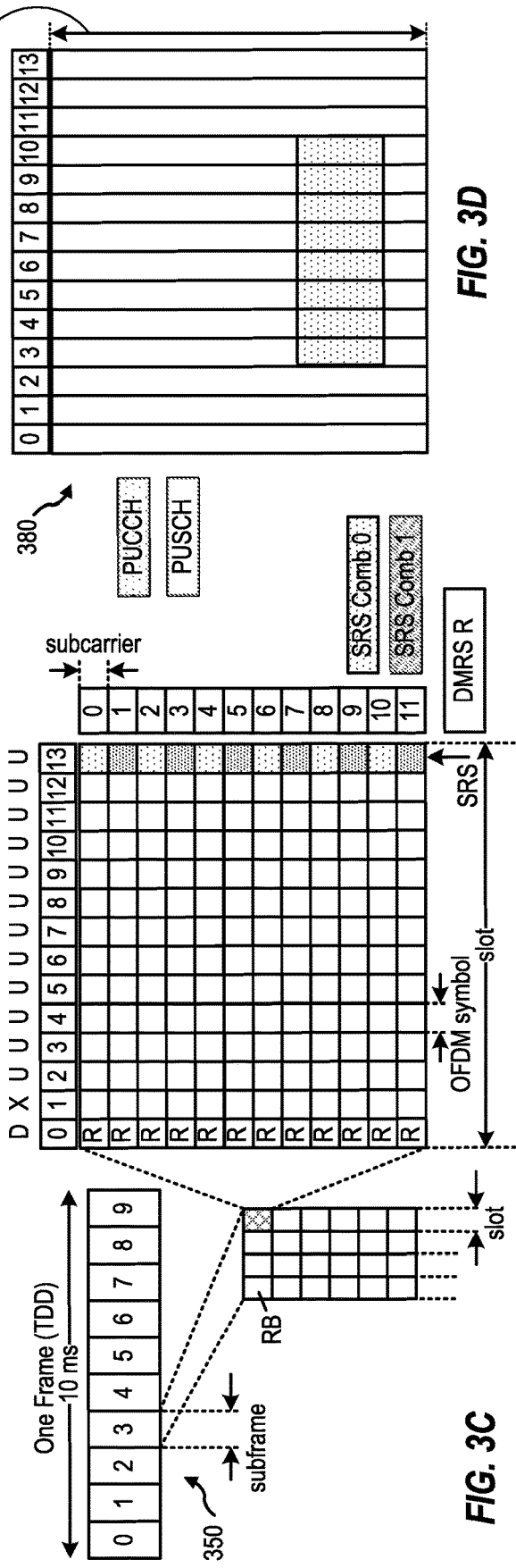

400

| DCI Format 1_1 ||
| --- | --- |
| Field | Bits |
| Identifier for DCI formats | 1 |
| Carrier Indicator | 0 or 3 |
| BWP Indicator | 0, 1, or 2 |
| Frequency domain resource assignment | variable |
| Time domain resource assignment | 0,1,2,3, or 4 |
| VRB-to-PRB mapping | 0 or 1 |
| PRB bundling size indicator | 0 or 1 |
| Rate matching indicator | 0, 1, or 2 |
| ZP CSI-RS trigger | 0, 1, or 2 |
| MCS | 5 |
| New data indicator | 1 |
| RV | 2 |
| HARQ process number | 4 |
| Downlink assignment index | 0, 2, or 4 |
| TPC command for scheduled PUCCH | 2 |
| PUCCH resource indicator | 3 |
| PDSCH-to-HARQ feedback timing indicator | 0, 1, 2, or 3 |
| Antenna port(s) | 4, 5, or 6 |
| TCI | 0 or 3 |
| SRS request | 2 |
| CBGTI | 0,2,4,6, or 8 |
| CBGFI | 0 or 1 |
| DMRS sequence initialization | 1 |

| DCI Format 1_0 | |
|---|---|
| Field | Bits |
| Identifier for DCI formats | 1 |
| ~~Carrier Indicator~~ | ~~0 or 3~~ |
| ~~BWP Indicator~~ | ~~0, 1, or 2~~ |
| Frequency domain resource assignment | variable |
| Time domain resource assignment | 4 |
| VRB-to-PRB mapping | 1 |
| ~~PRB bundling size indicator~~ | ~~0 or 1~~ |
| ~~Rate matching indicator~~ | ~~0, 1, or 2~~ |
| ~~ZP CSI-RS trigger~~ | ~~0, 1, or 2~~ |
| MCS | 5 |
| New data indicator | 1 |
| RV | 2 |
| HARQ process number | 4 |
| Downlink assignment index | 2 |
| TPC command for scheduled PUCCH | 2 |
| PUCCH resource indicator | 3 |
| PDSCH-to-HARQ feedback timing indicator | 0, 1, 2, or 3 |
| ~~Antenna port(s)~~ | ~~4, 5, or 6~~ |
| ~~TCI~~ | ~~0 or 3~~ |
| ~~SRS request~~ | ~~2~~ |
| ~~CBGTI~~ | ~~0, 2, 4, 6, or 8~~ |
| ~~CBGFI~~ | ~~0 or 1~~ |
| ~~DMRS sequence initialization~~ | ~~1~~ |

*FIG. 5*

COMPACT DOWNLINK CONTROL INFORMATION WITH PRECONFIGURED SCHEDULING PARAMETERS

INTRODUCTION

Aspects of the present disclosure relate to wireless communications, and more particularly, to techniques for efficiently signaling downlink control information (DCI).

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

One aspect provides a method of wireless communication by a user equipment (UE), including receiving, from a network entity, downlink control information (DCI) that includes a first field that indicates a preconfigured option for interpreting at least a second field associated with the DCI; interpreting at least the second field in accordance with the preconfigured option indicated by the first field; and communicating with the network entity in accordance with the interpretation of the second field.

One aspect provides a method of wireless communication by a network entity, including transmitting, to a UE, DCI that includes a first field that indicates a preconfigured option for interpreting at least a second field associated with the DCI; and communicating with the UE in accordance with an interpretation of the second field in accordance with the preconfigured option indicated by the first field.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIGS. 3A, 3B, 3C, and 3D depict various example aspects of data structures for a wireless communication network.

FIG. 4 is a table showing example fields of a normal downlink control information (DCI) format.

FIG. 5 is a table showing an example of a compact DCI format.

DETAILED DESCRIPTION

Aspects of the present disclosure relate to wireless communications, and more particularly, to techniques for efficiently signaling downlink control information (DCI).

DCI is transmitted on a Physical Downlink Control Channel (PDCCH) and provides a user equipment (UE) with information for processing an uplink or downlink transmission scheduled by the DCI. This information may include, for example, an indication of time and frequency resources, as well as transmission parameters to be applied to the scheduled transmission. For an uplink transmission, the DCI indicates such parameters to be applied by the UE in its transmission. For a downlink transmission, the DCI indicates such parameters to be applied by the UE in receiving a transmission from a network entity.

Multiple DCI formats are defined, for different purposes, and such formats may have different sizes. In general, reduction of DCI size is desirable to enhance coverage, as the reduced size may allow more time and frequency resources to be used for transmission, increasing the likelihood of successful decoding by the UE.

Compact DCI has been introduced for the purpose of reducing the size of DCI. Compact DCI typically only has the bare minimum of fields for scheduling parameters and a limited predefined range of selections for many of the scheduling parameters. In some cases, additional parameters may be needed. In such cases, predefined restriction of the range of parameters may reduce flexibility of gNB. While a two-stage DCI has been proposed to allow for additional parameters, where a compact DCI format precedes a second stage DCI, this approach adds latency.

Aspects of the present disclosure provide techniques for utilizing a compact DCI that also allow for a greater number of parameters. In some cases, the interpretation of one or more DCI fields and/or the interpretation of the value of one or more absent DCI fields may be determined based on preconfigured rules. As will be described in greater detail below, by utilizing the preconfigured rules and/or preconfigured sets of parameters, the techniques presented herein may help support an increased range of selection for various parameters without adding the latency of two-stage DCI.

Introduction to Wireless Communication Networks

Figure 1:
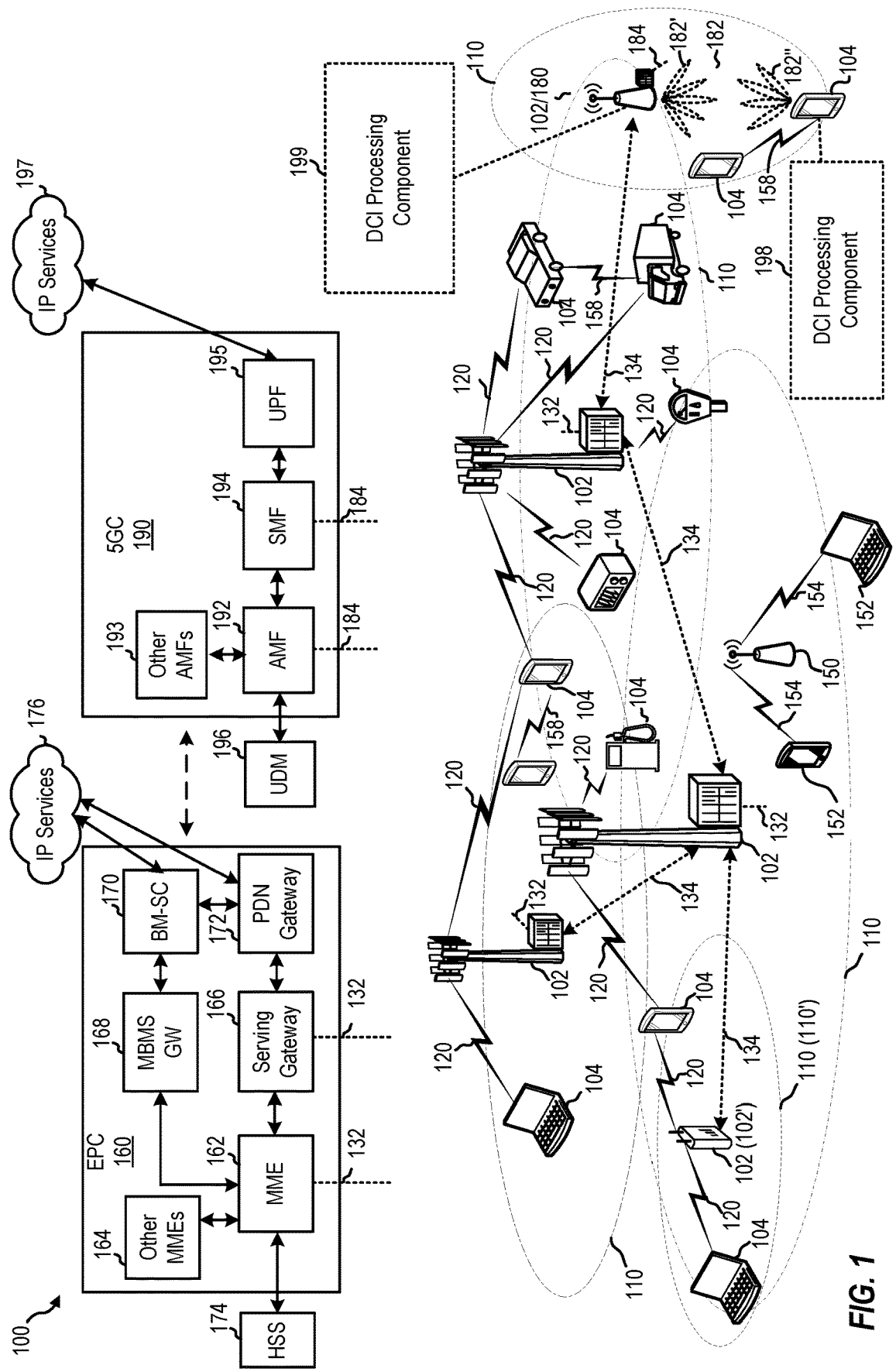
FIG. 1 is a block diagram conceptually illustrating an example wireless communication network.

FIG. 1 depicts an example of a wireless communication network 100, in which aspects described herein may be implemented.

Generally, wireless communication network 100 includes base stations (BSs) 102, user equipments (UEs) 104, one or more core networks, such as an Evolved Packet Core (EPC) 160 and 5G Core (5GC) network 190, which interoperate to provide wireless communications services.

BSs 102 may provide an access point to the EPC 160 and/or 5GC 190 for a UE 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

A base station, such as BS 102, may include components that are located at a single physical location or components located at various physical locations. In examples in which the base station includes components that are located at various physical locations, the various components may each perform various functions such that, collectively, the various components achieve functionality that is similar to a base station that is located at a single physical location. As such, a base station may equivalently refer to a standalone base station or a base station including components that are located at various physical locations or virtualized locations. In some implementations, a base station including components that are located at various physical locations may be referred to as or may be associated with a disaggregated radio access network (RAN) architecture, such as an Open RAN (O-RAN) or Virtualized RAN (VRAN) architecture. In some implementations, such components of a base station may include or refer to one or more of a central unit (CU), a distributed unit (DU), or a radio unit (RU).

BSs 102 wirelessly communicate with UEs 104 via communications links 120. Each of BSs 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may also receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

Wireless communication network 100 includes DCI processing component 199, which may configure one or more aspects of DCI interpretation (e.g., interpretation of a second field in DCI) by UEs 104. Wireless communication network 100 further includes DCI processing component 198, which may be used to receive and interpret DCI.

Figure 2:
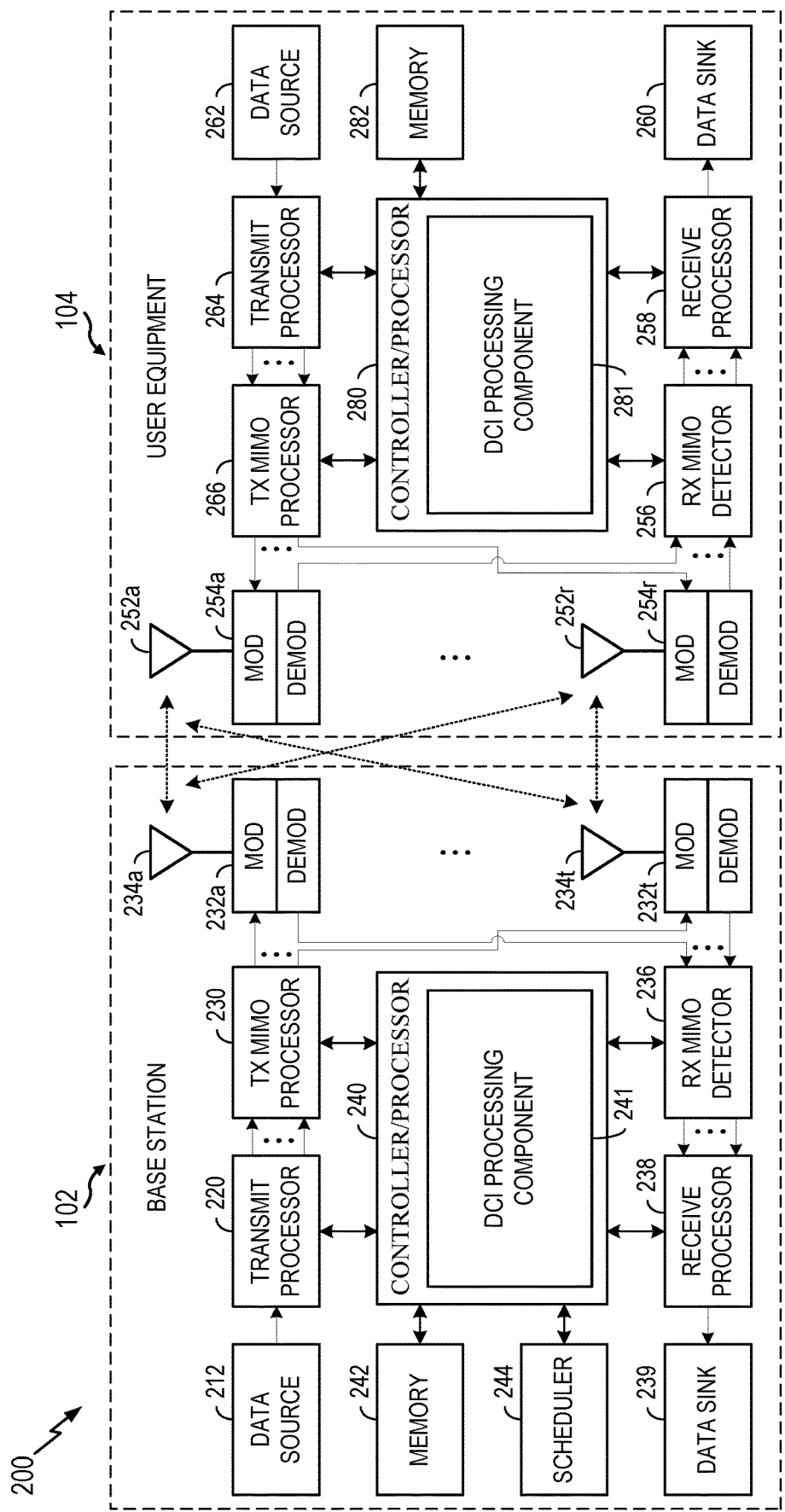
FIG. 2 is a block diagram conceptually illustrating aspects of an example of a base station and user equipment.

FIG. 2 depicts aspects of an example BS 102 and a UE 104. Generally, BS 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., data source 212) and wireless reception of data (e.g., data sink 239). For example, BS 102 may send and receive data between itself and UE 104.

BS 102 includes controller/processor 240, which may be configured to implement various functions related to wireless communications. In the depicted example, controller/ processor 240 includes DCI processing component 241, which may be representative of DCI processing component 199 of FIG. 1. Notably, while depicted as an aspect of controller/processor 240, DCI processing component 241 may be implemented additionally or alternatively in various other aspects of BS 102 in other implementations.

Generally, UE 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., data source 262) and wireless reception of data (e.g., data sink 260).

UE 104 includes controller/processor 280, which may be configured to implement various functions related to wireless communications. In the depicted example, controller/processor 280 includes DCI processing component 281, which may be representative of DCI processing component 198 of FIG. 1. Notably, while depicted as an aspect of controller/processor 280, DCI processing component 281 may be implemented additionally or alternatively in various other aspects of UE 104 in other implementations.

FIGS. 3A, 3B, 3C, and 3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A, 3B, 3C, and 3D are provided later in this disclosure.

Introduction to mmWave Wireless Communications

In wireless communications, an electromagnetic spectrum is often subdivided into various classes, bands, channels, or other features. The subdivision is often provided based on wavelength and frequency, where frequency may also be referred to as a carrier, a subcarrier, a frequency channel, a tone, or a subband.

5G networks may utilize several frequency ranges, which in some cases are defined by a standard, such as the 3GPP standards. For example, 3GPP technical standard TS 38.101 currently defines Frequency Range 1 (FR1) as including 600 MHz-6 GHz, though specific uplink and downlink allocations may fall outside of this general range. Thus, FR1 is often referred to (interchangeably) as a "Sub-6 GHz" band.

Similarly, TS 38.101 currently defines Frequency Range 2 (FR2) as including 26-41 GHz, though again specific uplink and downlink allocations may fall outside of this general range. FR2, is sometimes referred to (interchangeably) as a "millimeter wave" ("mmW" or "mmWave") band, despite being different from the extremely high frequency (EHF) band (30 GHz-300 GHz) that is identified by the International Telecommunications Union (ITU) as a "millimeter wave" band because wavelengths at these frequencies are between 1 millimeter and 10 millimeters.

Communications using mmWave/near mmWave radio frequency band (e.g., 3 GHz-300 GHz) may have higher path loss and a shorter range compared to lower frequency communications. As described above with respect to FIG. 1, a base station (e.g., 180) configured to communicate using mmWave/near mmWave radio frequency bands may utilize beamforming (e.g., 182) with a UE (e.g., 104) to improve path loss and range.

Overview of Compact DCI

As noted above, various DCI formats are defined for various purposes and compact DCI formats have been introduced to reduce the number of bits for some of these various DCI formats (such as DCI formats 0_0 and 1_0). The smaller payload of compact DCI may help achieve higher reliability than a normal DCI with a same aggregation level (AL) value, which refers to how many control channel elements (CCEs) are allocated for a PDCCH.

Compact DCI may be designed by reducing the size (number of bits) of some fields, as well as by eliminating certain fields. In some cases, radio resource control (RRC) parameters) may be configured such that certain fields of certain compact DCI formats (e.g., DCI formats 0_2 and 1_2) are configurable without losing scheduling flexibility.

In some cases, compact DCI may be used as a form of fallback DCI. For example, fallback DCI may be used when a transmission mode of a UE is unknown, the types of DCI formats supported by the UE are unknown, when channel quality is poor, or during RRC reconfiguration. The compact/fallback DCI message may have a smaller payload when compared to a full DCI message. In some cases, some fields included in the full DCI message are absent in the smaller, fallback DCI message.

FIG. 5 illustrates one example of a DCI format 1_0 that may be used as a fallback DCI. A comparison of FIG. 4 and FIG. 5 illustrates how compact DCI format 1_0 may be formed by removing certain fields of DCI format 1_1. In some cases, one or more fields may be configurable in DCI format 1_1. For example, a downlink beam indication may be semi-statically configured to be either present or absent in a full DCI message (as shown in FIG. 4), but may be always omitted in a fallback DCI (as shown in FIG. 5). As shown in FIG. 5, the compact format 1_0 may not include a carrier indicator field (CIF) and may not include a rate matching indicator field.

Aspects Related to Compact DCI with
Preconfigured Scheduling Parameters

Aspects of the present disclosure provide techniques for utilizing a compact DCI that also allow for a greater number of parameters. In some cases, the interpretation of one or more DCI fields and/or the interpretation of the value of one or more absent DCI fields may be determined based on preconfigured rules. As will be described in greater detail below, by utilizing the preconfigured rules and/or preconfigured sets of parameters, the techniques presented herein may help support an increased range of selection for various parameters without adding the latency of two-stage DCI.

As noted above, compact DCI has been introduced to reduce the DCI size and enhance coverage. In certain cases, such as the fallback example noted above, compact DCI may have only a reduced subset (e.g., a minimum) of bits/fields for scheduling parameters. For different applications, more parameters may be needed than in others. For example, cross-carrier scheduling or multi-layer transmission may be needed in some cases.

Existing fields may also be reduced by using limited predefined ranges of selections of certain parameters. While predefined restriction on the ranges of certain parameters, such as modulation and coding schemes (MCS) may reduce DCI payload size, it may also reduce the flexibility of the scheduling network entity (e.g., a base station, such as a gNB).

While a two-stage DCI, where a compact DCI format precedes a second stage DCI, may allow for additional parameters, this approach adds latency. Aspects of the present disclosure, however, provide signaling techniques that may help provide compact/light DCI, while still providing the flexibility to indicate different parameters in a single DCI (without the latency of two-stage DCI).

According to aspects of the present disclosure, a gNB (or other network entity) may schedule a (downlink or uplink) data transmission using a DCI with at least one of a reduced number of fields or fields of reduced size (fewer bits). As will be described in greater detail below, the interpretation of some such fields or the values of some absent fields may be determined based on one or more preconfigured rules.

Figure 6:
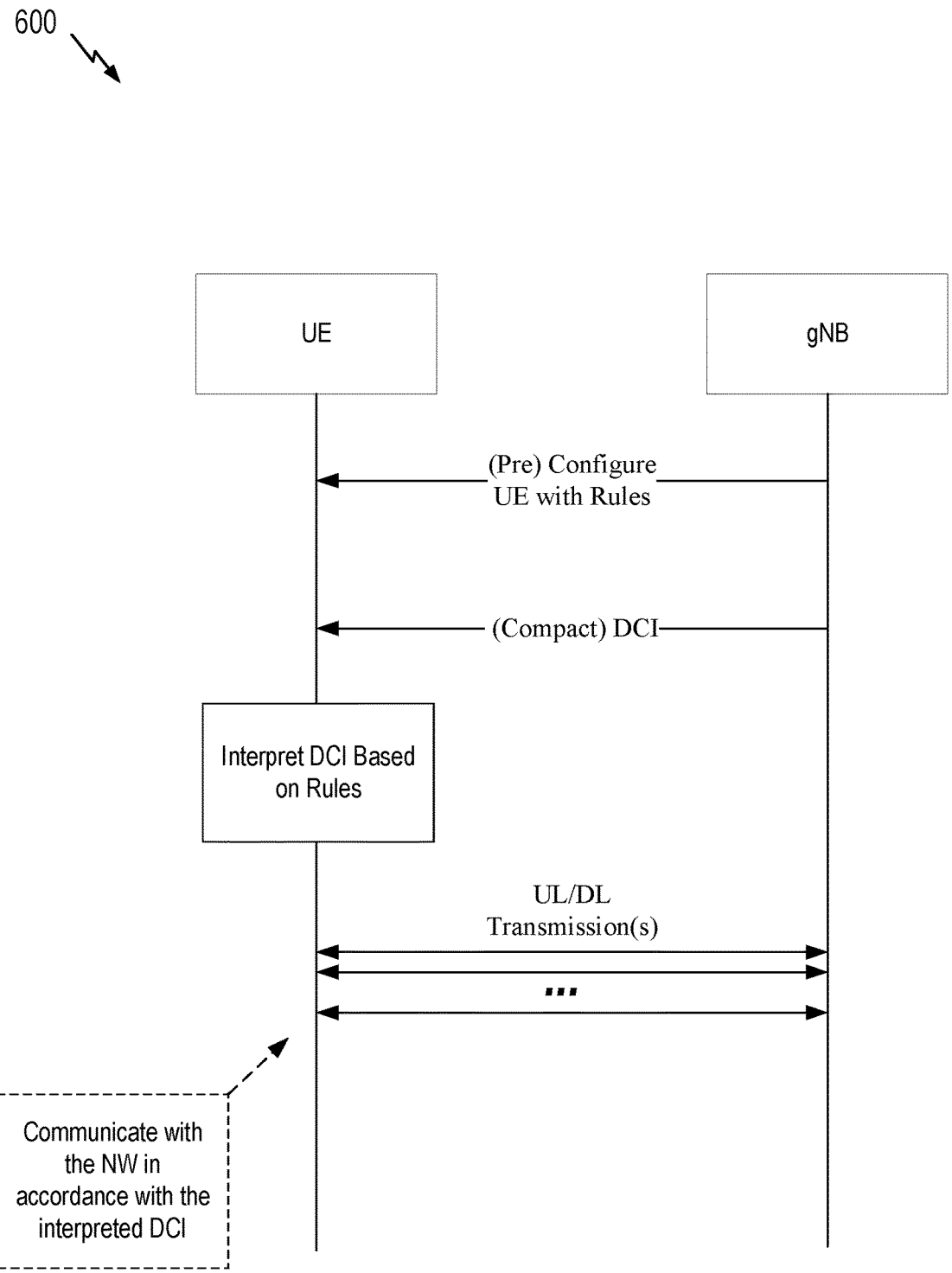
FIG. 6 depicts an example call flow diagram for compact DCI signaling, in accordance with aspects of the present disclosure.

The concept of interpreting DCI based on preconfigured rules in this manner may be understood with reference to the call flow diagram of FIG. 6.

As illustrated, the gNB may pre-configure the UE with a set of rules for interpreting (compact) DCI. The gNB may then send the UE a DCI (e.g., to schedule an uplink or downlink transmission). The DCI may be of a compact DCI format that is compressed relative to another DCI format. For example, the compact DCI may have fewer bits in one or more fields, relative to the other DCI format or may have fewer fields.

The UE interprets the DCI based on the pre-configured rules and communicates with the network based on the interpretation (e.g., to process uplink and/or downlink messages scheduled by the DCI).

The set of rules may be configured in any suitable manner using any suitable signaling, such as via radio resource control (RRC) configuration. For example, the preconfigured rules could be configured as part of a PDCCH search space configuration and/or a PDCCH control resource set (CORESET) configuration.

The preconfigured rules may be configured as part of configuration of a configurable DCI. For example, the preconfigured rules may be indicated along with an indication of configurable fields of one or more DCI formats (e.g., that indicate whether certain fields are included and/or the number of bits in such fields as described above with reference to FIG. 4).

In some cases, the preconfigured rules may determine the value of a scheduling parameter based on the values of fields that are present in the compact DCI. As an example, a transmission configuration indicator (TCI) state indicated by the DCI may determine some parameters that are not indicated directly by the (compact) DCI. As another example, the TCI state indicated by the DCI may change the interpretation of some other field. For example, the TCI state indicated by the DCI may change the interpretation of one or both of a time domain resource allocation (TDRA) field or a modulation and coding scheme (MCS).

The concept of interpreting DCI based on preconfigured rules in this manner may be understood with reference to the call flow diagram of FIG. 6.

In some cases, the preconfigured rules may determine how one or more fields of the DCI are interpreted. For example, interpretation of MCS field values (e.g., the actual MCS the indicated values map to) may be based on rules preconfigured via RRC.

Figure 7:
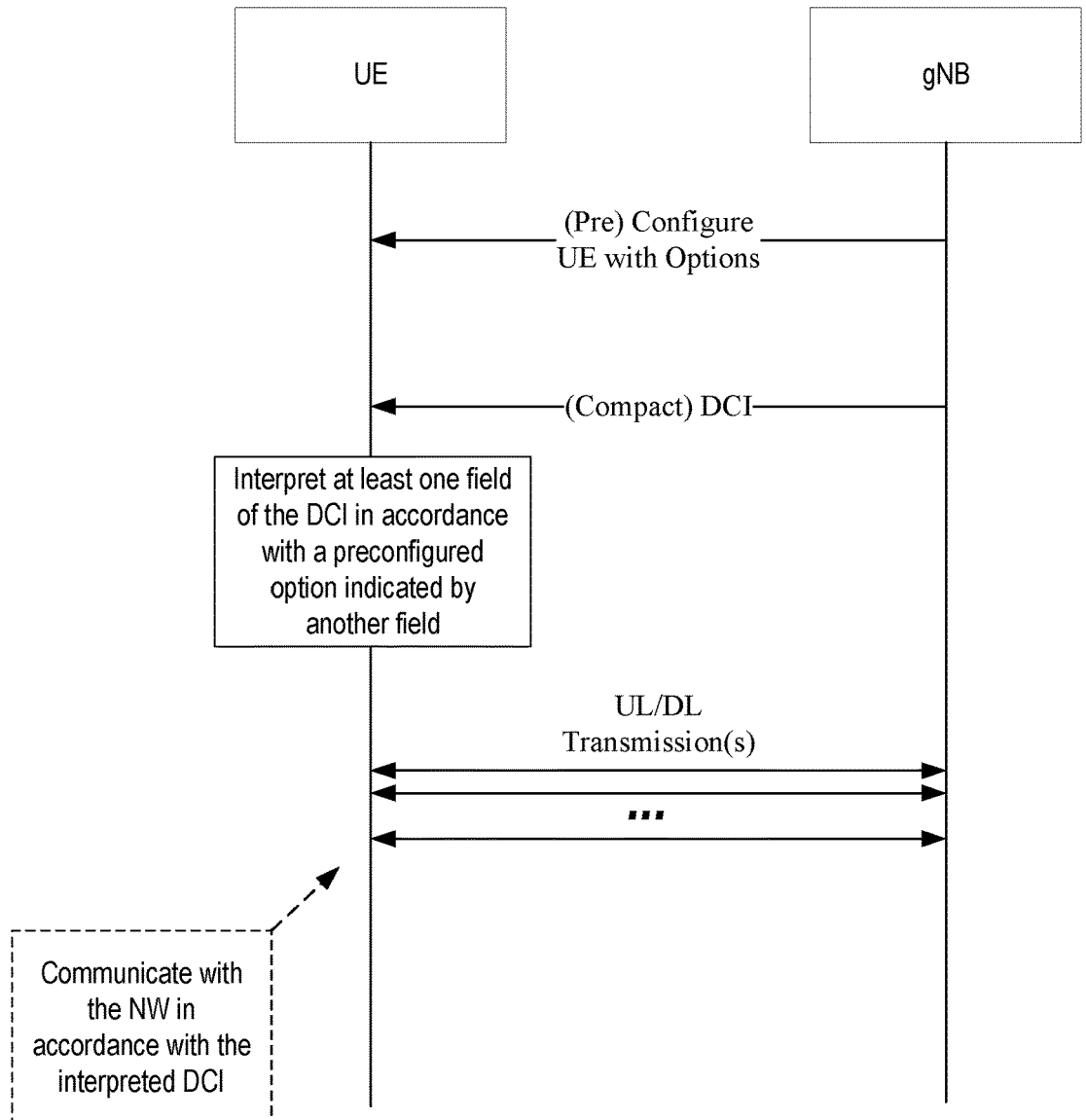
FIG. 7 depicts another example call flow diagram for compact DCI signaling, in accordance with aspects of the present disclosure.

As shown in the call flow diagram of FIG. 7, in some cases, one DCI field (present or missing) may be interpreted based on another DCI field.

Just as shown in the previous example of FIG. 6, the UE in FIG. 7 is pre-configured with options for interpreting DCI. In this case, the UE interprets at least one field associated with the DCI in accordance with a preconfigured option indicated by another field.

In some cases, the UE may interpret a field in the DCI (or a field missing from the DCI) based on an indication provided in another field. For example, a designated field of the DCI may indicate one of the preconfigured rules to use for interpreting one or more other fields in the DCI.

The techniques described herein for interpreting one or more DCI fields and/or values of one or more absent DCI fields based on preconfigured rules may be applicable to a variety of different types of DCI.

For example, the techniques described herein may be applicable to DCI scheduling downlink data and/or to DCI scheduling UL data.

The techniques described herein may also be applicable to DCI that is used for activating semi persistent scheduling (SPS) downlink transmissions and/or configured grant (CG) uplink transmissions. The techniques described herein may also be applicable to DCI that is used for activating semi-persistent CSI reporting by the UE.

The techniques for interpreting compact DCI described herein may be applicable when certain conditions are met. For example, the techniques for interpreting compact DCI described herein may be applied (or not applied) depending on one or more of an operating frequency range, frequency band, or subcarrier spacing.

In some cases, techniques for interpreting compact DCI described herein may be applied (or not applied) depending on a capability of the UE. For example, the UE may indicate (in an UE capability report) whether it supports interpreting compact DCI as described herein.

Example Methods

Figure 8:
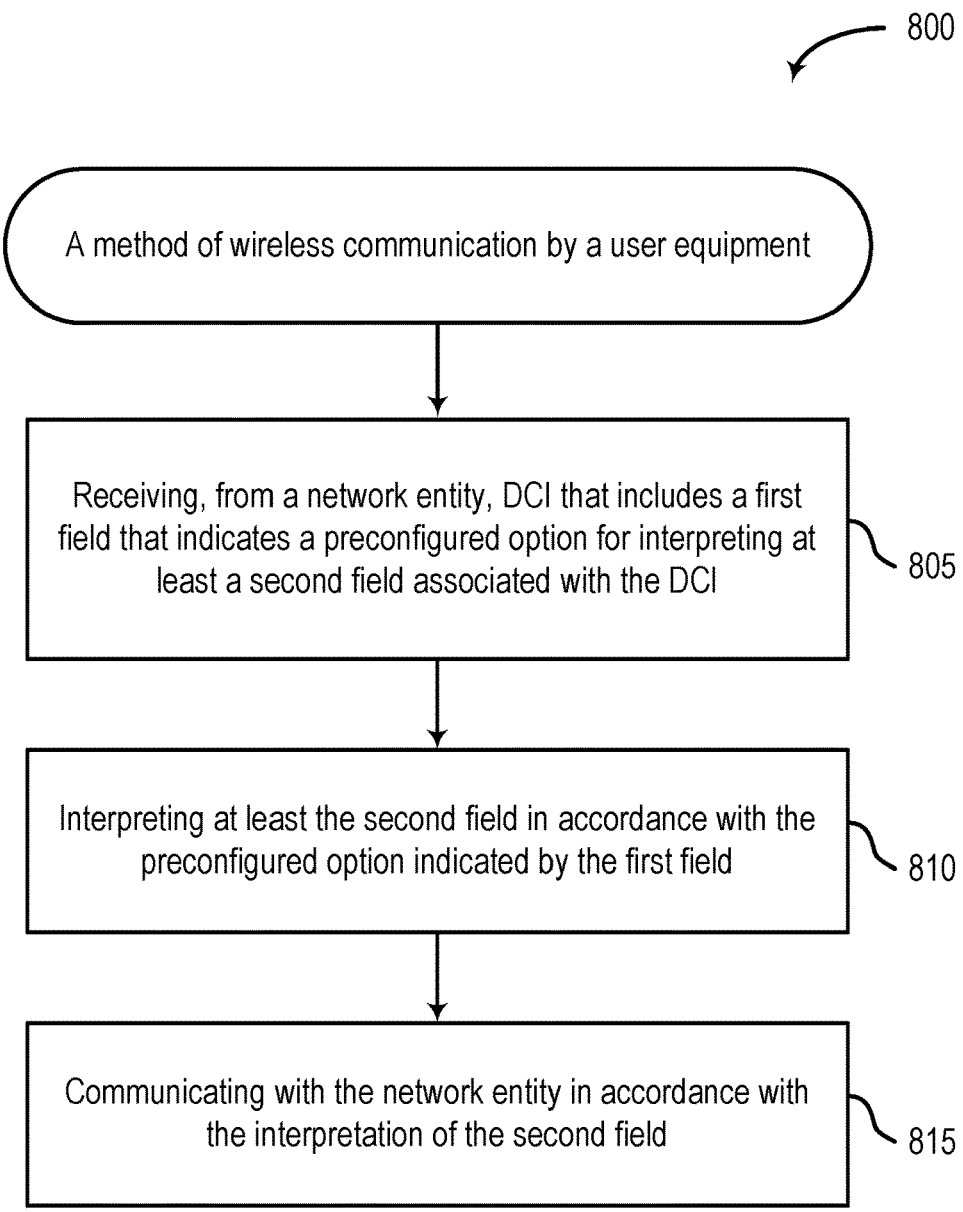
FIGS. 8 and 9 depict example processes of wireless communication according to aspects of the present disclosure.

FIG. 8 shows an example of a method 800 for wireless communication according to aspects of the present disclosure. In some aspects, a user equipment, such as UE 104 of FIGS. 1 and 2, or processing system 1005 of FIG. 10, may perform the method 800.

Method 800 begins at step 805 with receiving, from a network entity, DCI that includes a first field that indicates a preconfigured option for interpreting at least a second field associated with the DCI. In some cases, the operations of this step refer to, or may be performed by, DCI reception circuitry as described with reference to FIG. 10.

Method 800 then proceeds to step 810 with interpreting at least the second field in accordance with the preconfigured option indicated by the first field. In some cases, the operations of this step refer to, or may be performed by, DCI interpretation circuitry as described with reference to FIG. 10.

Method 800 then proceeds to step 815 with communicating with the network entity in accordance with the interpretation of the second field. In some cases, the operations of this step refer to, or may be performed by, network communication circuitry as described with reference to FIG. 10.

In some aspects, the DCI has a first DCI format that is compressed relative to a second DCI format in that at least one of: the second field has fewer bits in the first DCI format than in the second DCI format or the second field is absent from the first DCI format.

In some aspects, method 800 further includes receiving RRC signaling configuring the UE with a set of preconfigured options for interpreting at least the second field based on preconfigured rules, wherein the first field indicates one of the set of preconfigured options for the UE to use for interpreting at least the second field. In some aspects, the preconfigured rules are configured as part of at least one of a PDCCH search space configuration, a CORESET configuration, or a configurable DCI configuration. In some aspects, the second field is associated with a scheduling parameter. In some aspects, the first field indicates a TCI state used to determine a value of the scheduling parameter. In some aspects, the set of preconfigured options is applicable depending on at least one of: a frequency range, band, or subcarrier spacing used for communication between the UE and the network entity.

In some aspects, the DCI schedules downlink data or uplink data. In some aspects, the DCI activates at least one of: a SPS downlink transmission, a CG uplink transmission, or a semi-persistent CSI report.

Figure 9:
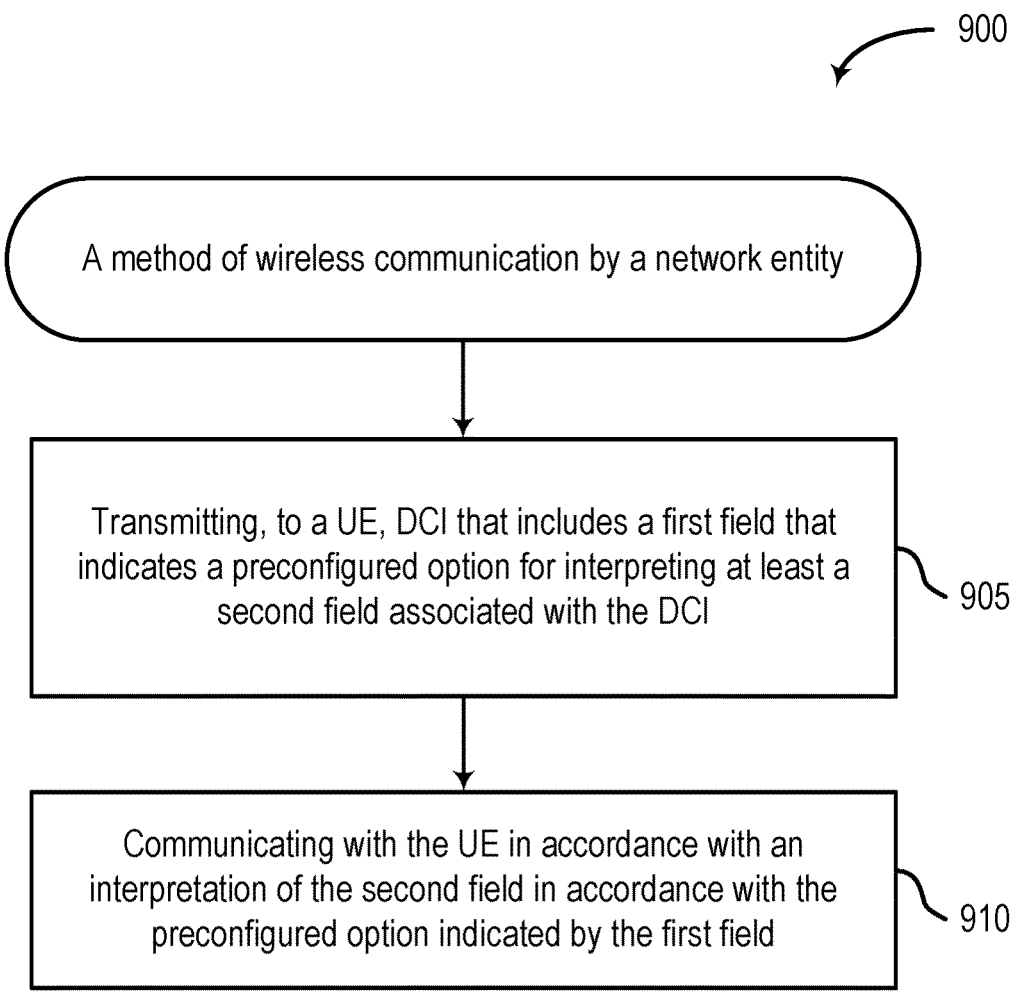

FIG. 9 shows an example of a method 900 for wireless communication according to aspects of the present disclosure. In some aspects, a base station, such as B S 102 of FIGS. 1 and 2, or processing system 1105 of FIG. 11, may perform the method 900.

Method 900 begins at step 905 with transmitting, to a UE, DCI that includes a first field that indicates a preconfigured option for interpreting at least a second field associated with the DCI. In some cases, the operations of this step refer to, or may be performed by, DCI configuration circuitry as described with reference to FIG. 11.

Method 900 then proceeds to step 910 with communicating with the UE in accordance with an interpretation of the second field in accordance with the preconfigured option indicated by the first field. In some cases, the operations of this step refer to, or may be performed by, UE communication circuitry as described with reference to FIG. 11.

In some aspects, the DCI has a first DCI format that is compressed relative to a second DCI format in that at least one of: the second field has fewer bits in the first DCI format than in the second DCI format or the second field is absent from the first DCI format.

In some aspects, method 900 further includes transmitting, to the UE, RRC signaling configuring the UE with a set of preconfigured options for interpreting at least the second field based on preconfigured rules, wherein the first field indicates one of the set of preconfigured options for the UE to use for interpreting at least the second field. In some aspects, the preconfigured rules are configured as part of at least one of a PDCCH search space configuration, a CORESET configuration, or a configurable DCI configuration. In some aspects, the second field is associated with a scheduling parameter. In some aspects, the first field indicates a TCI state used to determine a value of the scheduling parameter. In some aspects, the set of preconfigured options is applicable depending on at least one of: a frequency range, band, or subcarrier spacing used for communication between the UE and the network entity.

In some aspects, the DCI schedules downlink data or uplink data. In some aspects, the DCI activates at least one of: a SPS downlink transmission, a CG uplink transmission, or a semi-persistent CSI report.

Example Wireless Communication Devices

Figure 10:
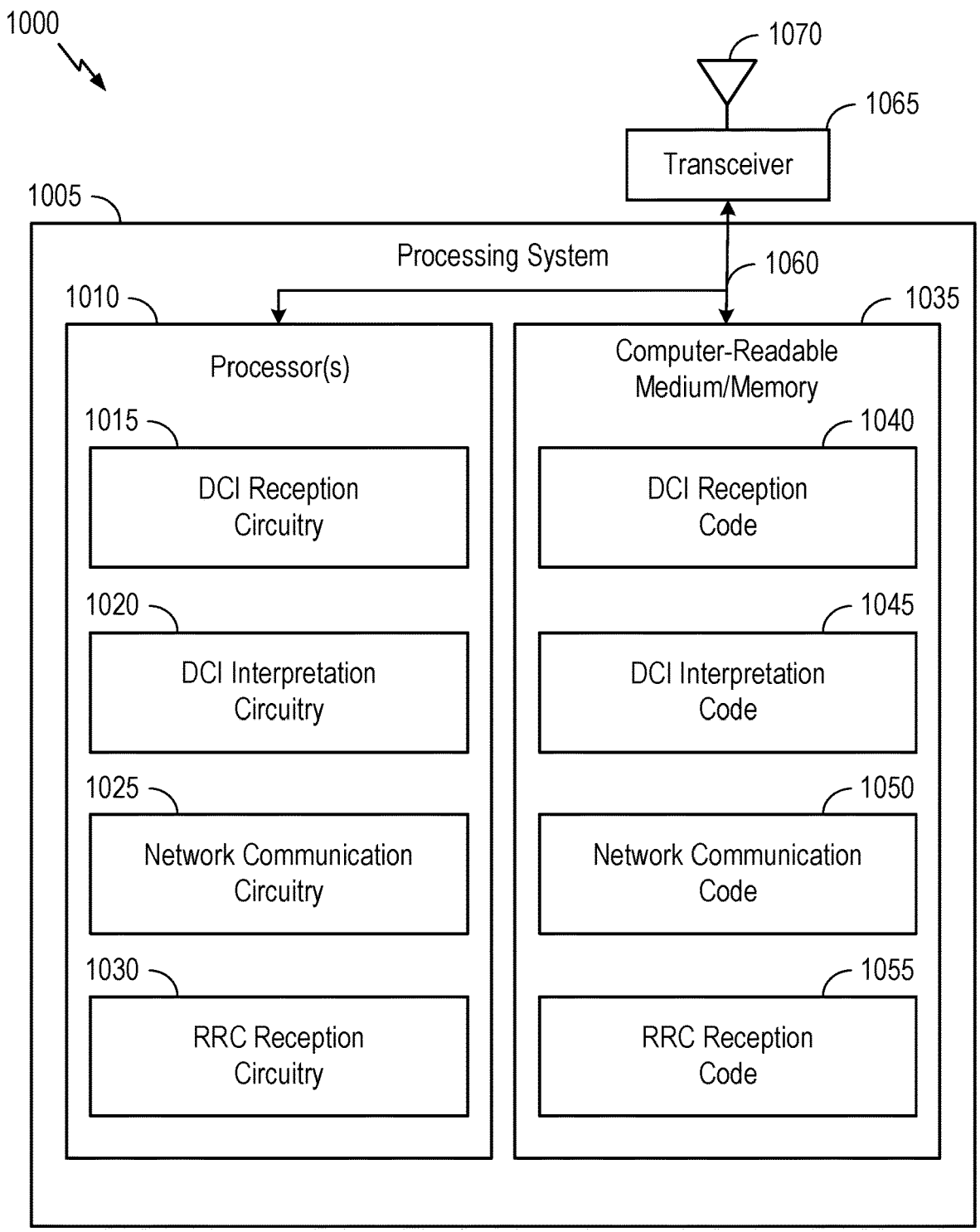
FIGS. 10 and 11 depict example communication devices according to aspects of the present disclosure.

FIG. 10 depicts an example communications device 1000 that includes various components operable, configured, or adapted to perform operations for the techniques disclosed herein, such as the operations depicted and described with respect to FIGS. 6-8. In some examples, communication device 1000 may be a UE 104 as described, for example with respect to FIGS. 1 and 2.

Communications device 1000 includes a processing system 1005 coupled to the transceiver 1065 (e.g., a transmitter and/or a receiver). The transceiver 1065 is configured to transmit (or send) and receive signals for the communications device 1000 via the antenna 1070, such as the various signals as described herein. The transceiver 1065 may communicate bi-directionally, via the antennas 1070, wired links, or wireless links as described herein. For example, the transceiver 1065 may represent a wireless transceiver and may communicate bi-directionally with another wireless transceiver. The transceiver 1065 may also include or be connected to a modem to modulate the packets and provide the modulated packets to for transmission, and to demodulate received packets. In some examples, the transceiver 1065 may be tuned to operate at specified frequencies. For example, a modem can configure the transceiver 1065 to operate at a specified frequency and power level based on the communication protocol used by the modem.

Processing system 1005 may be configured to perform processing functions for communications device 1000, including processing signals received and/or to be transmitted by communications device 1000. Processing system 1005 includes one or more processors 1010 coupled to a computer-readable medium/memory 1035 via a bus 1060.

In some examples, one or more processors 1010 may include one or more intelligent hardware devices, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the one or more processors 1010 are configured to operate a memory array using a memory controller. In other cases, a memory controller is integrated into the one or more processors 1010. In some cases, the one or more processors 1010 are configured to execute computer-readable instructions stored in a memory to perform various functions. In some aspects, one or more processors 1010 include special purpose components for modem processing, baseband processing, digital signal processing, or transmission processing.

In certain aspects, computer-readable medium/memory 1035 is configured to store instructions (e.g., computer-executable code) that when executed by the one or more processors 1010, cause the one or more processors 1010 to perform the operations illustrated in FIGS. 6-8, or other operations for performing the various techniques discussed herein.

In one aspect, computer-readable medium/memory 1035 includes DCI reception code 1040, DCI interpretation code 1045, network communication code 1050, and RRC reception code 1055.

Examples of a computer-readable medium/memory 1035 include random access memory (RAM), read-only memory (ROM), solid state memory, a hard drive, a hard disk drive, etc. In some examples, computer-readable medium/memory 1035 is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

Various components of communications device 1000 may provide means for performing the methods described herein, including with respect to FIGS. 6-8.

In some examples, means for transmitting or sending (or means for outputting for transmission) may include transceivers 254 and/or antenna(s) 252 of the UE 104 illustrated in FIG. 2 and/or the transceiver 1065 and the antenna 1070 of the communication device in FIG. 10.

In some examples, means for receiving (or means for obtaining) may include transceivers 254 and/or antenna(s) 252 of the UE 104 illustrated in FIG. 2 and/or the transceiver 1065 and the antenna 1070 of the communication device in FIG. 10.

In some examples, means for interpreting and/or means for communicating may include various processing system 1005 components, such as: the one or more processors 1010 in FIG. 10, or aspects of the UE 104 depicted in FIG. 2, including receive processor 258, transmit processor 264, TX MIMO processor 266, and/or controller/processor 280 (including DCI processing component 281).

In one aspect, one or more processors 1010 includes DCI reception circuitry 1015, DCI interpretation circuitry 1020, network communication circuitry 1025, and RRC reception circuitry 1030.

According to some aspects, DCI reception circuitry 1015 receives, from a network entity, DCI that includes a first field that indicates a preconfigured option for interpreting at least a second field associated with the DCI. According to some aspects, DCI interpretation circuitry 1020 interprets at least the second field in accordance with the preconfigured option indicated by the first field. According to some aspects, network communication circuitry 1025 communicates with the network entity in accordance with the interpretation of the second field.

In some aspects, the DCI has a first DCI format that is compressed relative to a second DCI format in that at least one of: the second field has fewer bits in the first DCI format than in the second DCI format or the second field is absent from the first DCI format.

According to some aspects, RRC reception circuitry 1030 receives RRC signaling configuring the UE with a set of preconfigured options for interpreting at least the second field based on preconfigured rules, wherein the first field indicates one of the set of preconfigured options for the UE to use for interpreting at least the second field. In some aspects, the preconfigured rules are configured as part of at least one of a PDCCH search space configuration, a CORESET configuration, or a configurable DCI configuration. In some aspects, the second field is associated with a scheduling parameter. In some aspects, the first field indicates a TCI state used to determine a value of the scheduling parameter. In some aspects, the set of preconfigured options is applicable depending on at least one of: a frequency range, band, or subcarrier spacing used for communication between the UE and the network entity.

In some aspects, the DCI schedules downlink data or uplink data. In some aspects, the DCI activates at least one of: a SPS downlink transmission, a CG uplink transmission, or a semi-persistent CSI report.

Notably, FIG. 10 is just one example, and many other examples and configurations of communication device are possible.

Figure 11:
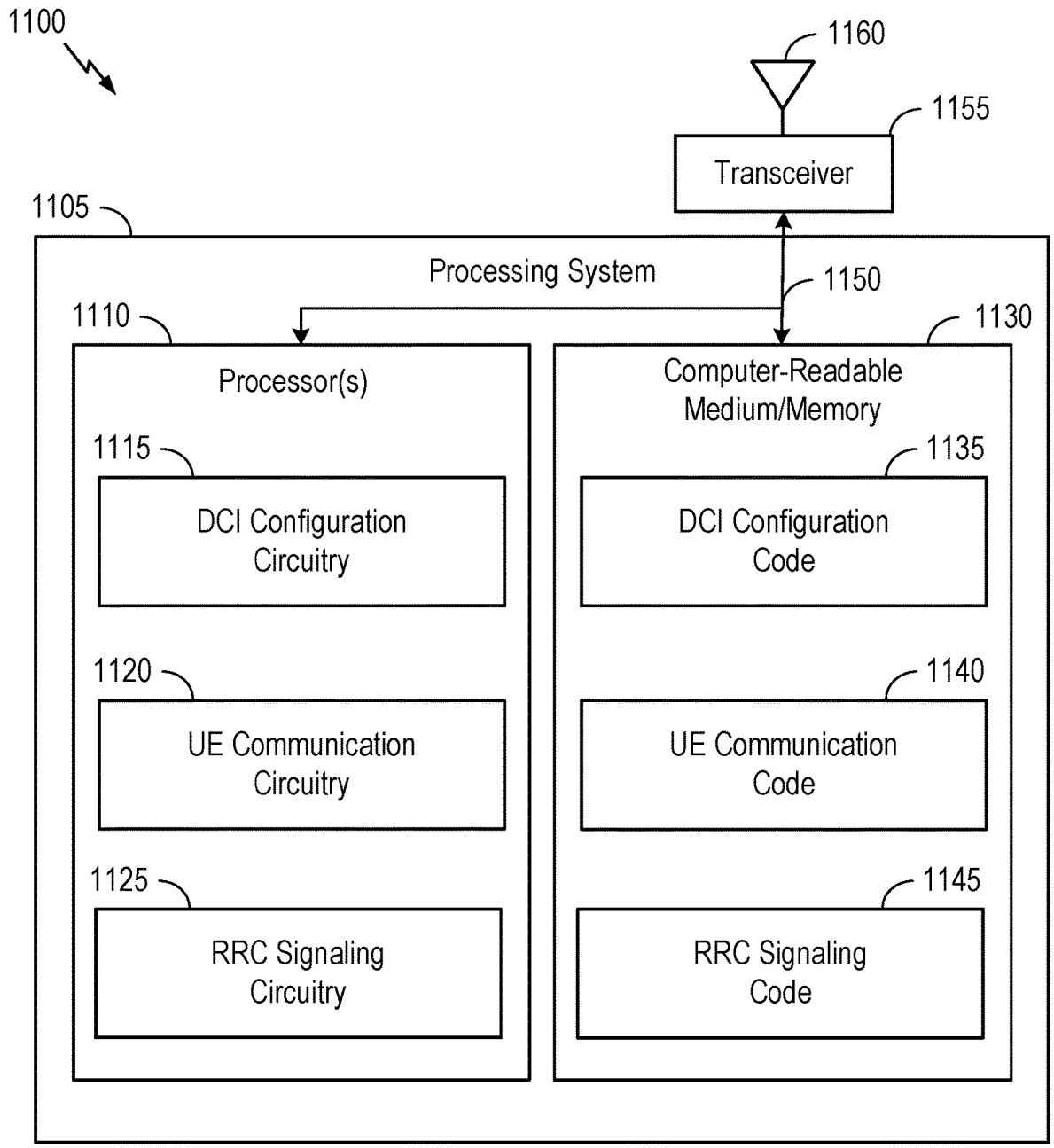

FIG. 11 depicts an example communications device 1100 that includes various components operable, configured, or adapted to perform operations for the techniques disclosed herein, such as the operations depicted and described with respect to FIG. 9. In some examples, communication device may be a BS 102 as described, for example with respect to FIGS. 1 and 2.

Communications device 1100 includes a processing system 1105 coupled to the transceiver 1155 (e.g., a transmitter and/or a receiver). The transceiver 1155 is configured to transmit (or send) and receive signals for the communications device 1100 via the antenna 1160, such as the various signals as described herein. The transceiver 1155 may communicate bi-directionally, via the antennas 1160, wired links, or wireless links as described herein. For example, the transceiver 1155 may represent a wireless transceiver and may communicate bi-directionally with another wireless transceiver. The transceiver 1155 may also include or be connected to a modem to modulate the packets and provide the modulated packets to for transmission, and to demodulate received packets. In some examples, the transceiver 1155 may be tuned to operate at specified frequencies. For example, a modem can configure the transceiver 1155 to operate at a specified frequency and power level based on the communication protocol used by the modem.

Processing system 1105 may be configured to perform processing functions for communications device 1100, including processing signals received and/or to be transmitted by communications device 1100. Processing system 1105 includes one or more processors 1110 coupled to a computer-readable medium/memory 1130 via a bus 1150.

In some examples, one or more processors 1110 may include one or more intelligent hardware devices, (e.g., a general-purpose processing component, a DSP, a CPU, a GPU, a microcontroller, an ASIC, a FPGA, a programmable logic device, a discrete gate or transistor logic component, a discrete hardware component, or any combination thereof). In some cases, the one or more processors 1110 are configured to operate a memory array using a memory controller. In other cases, a memory controller is integrated into the one or more processors 1110. In some cases, the one or more processors 1110 are configured to execute computer-readable instructions stored in a memory to perform various functions. In some aspects, one or more processors 1110 include special purpose components for modem processing, baseband processing, digital signal processing, or transmission processing.

In certain aspects, computer-readable medium/memory 1130 is configured to store instructions (e.g., computer-executable code) that when executed by the one or more processors 1110, cause the one or more processors 1110 to perform the operations illustrated in FIG. 9, or other operations for performing the various techniques discussed herein.

In one aspect, computer-readable medium/memory 1130 includes DCI configuration code 1135, UE communication code 1140, and RRC signaling code 1145.

Examples of a computer-readable medium/memory 1130 include RAM, ROM, solid state memory, a hard drive, a hard disk drive, etc. In some examples, computer-readable medium/memory 1130 is used to store computer-readable, computer-executable software including instructions that, when executed, cause a processor to perform various functions described herein. In some cases, the memory contains, among other things, a BIOS which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

Various components of communications device 1100 may provide means for performing the methods described herein, including with respect to FIG. 9.

In some examples, means for transmitting or sending (or means for outputting for transmission) may include transceivers 232 and/or antenna(s) 234 of the BS 102 illustrated in FIG. 2 and/or the transceiver 1155 and the antenna 1160 of the communication device in FIG. 11.

In some examples, means for receiving (or means for obtaining) may include transceivers 232 and/or antenna(s) 234 of the BS 102 illustrated in FIG. 2 and/or the transceiver 1155 and the antenna 1160 of the communication device in FIG. 11.

In some examples, means for communicating may include various processing system 1105 components, such as: the one or more processors 1110 in FIG. 11, or aspects of the BS 102 depicted in FIG. 2, including receive processor 238, transmit processor 220, TX MIMO processor 230, and/or controller/processor 240 (including DCI processing component 241).

In one aspect, one or more processors 1110 includes DCI configuration circuitry 1115, UE communication circuitry 1120, and RRC signaling circuitry 1125.

According to some aspects, DCI configuration circuitry 1115 transmits, to a UE, DCI that includes a first field that indicates a preconfigured option for interpreting at least a second field associated with the DCI. According to some aspects, UE communication circuitry 1120 communicates with the UE in accordance with an interpretation of the second field in accordance with the preconfigured option indicated by the first field.

In some aspects, the DCI has a first DCI format that is compressed relative to a second DCI format in that at least one of: the second field has fewer bits in the first DCI format than in the second DCI format or the second field is absent from the first DCI format.

According to some aspects, RRC signaling circuitry 1125 transmits, to the UE, RRC signaling configuring the UE with a set of preconfigured options for interpreting at least the second field based on preconfigured rules, wherein the first field indicates one of the set of preconfigured options for the UE to use for interpreting at least the second field. In some aspects, the preconfigured rules are configured as part of at least one of a PDCCH search space configuration, a CORESET configuration, or a configurable DCI configuration. In some aspects, the second field is associated with a scheduling parameter. In some aspects, the first field indicates a TCI state used to determine a value of the scheduling parameter. In some aspects, the set of preconfigured options is applicable depending on at least one of: a frequency range, band, or subcarrier spacing used for communication between the UE and the network entity.

In some aspects, the DCI schedules downlink data or uplink data. In some aspects, the DCI activates at least one of: a SPS downlink transmission, a CG uplink transmission, or a semi-persistent CSI report.

Notably, FIG. 11 is just one example, and many other examples and configurations of communication device are possible.

Example Clauses

Implementation examples are described in the following numbered clauses:

Clause 1: A method of wireless communication by a UE, the method comprising: receiving, from a network entity, DCI that includes a first field that indicates a preconfigured option for interpreting at least a second field associated with the DCI; interpreting at least the second field in accordance with the preconfigured option indicated by the first field; and communicating with the network entity in accordance with the interpretation of the second field.

Clause 2: The method of Clause 1, wherein the DCI has a first DCI format that is compressed relative to a second DCI format in that at least one of: the second field has fewer bits in the first DCI format than in the second DCI format; or the second field is absent from the first DCI format.

Clause 3: The method of any one of Clauses 1 and 2, further comprising: receiving RRC signaling configuring the UE with a set of preconfigured options for interpreting at least the second field based on preconfigured rules, wherein the first field indicates one of the set of preconfigured options for the UE to use for interpreting at least the second field.

Clause 4: The method of Clause 3, wherein the preconfigured rules are configured as part of at least one of a PDCCH search space configuration, a CORESET configuration, or a configurable DCI configuration.

Clause 5: The method of Clause 3, wherein the second field is associated with a scheduling parameter. In some aspects, the first field indicates a TCI state used to determine a value of the scheduling parameter.

Clause 6: The method of Clause 3, wherein the set of preconfigured options is applicable depending on at least one of: a frequency range, band, or subcarrier spacing used for communication between the UE and the network entity.

Clause 7: The method of any one of Clauses 1-6, wherein the DCI schedules downlink data or uplink data.

Clause 8: The method of any one of Clauses 1-7, wherein the DCI activates at least one of: a SPS downlink transmission, a CG uplink transmission, or a semi-persistent CSI report.

Clause 9: A method of wireless communication by a network entity, the method comprising: transmitting, to a UE, DCI that includes a first field that indicates a preconfigured option for interpreting at least a second field associated with the DCI; and communicating with the UE in accordance with an interpretation of the second field in accordance with the preconfigured option indicated by the first field.

Clause 10: The method of Clause 9, wherein the DCI has a first DCI format that is compressed relative to a second DCI format in that at least one of: the second field has fewer bits in the first DCI format than in the second DCI format or the second field is absent from the first DCI format.

Clause 11: The method of any one of Clauses 9 and 10, further comprising: transmitting, to the UE, RRC signaling configuring the UE with a set of preconfigured options for interpreting at least the second field based on preconfigured rules, wherein the first field indicates one of the set of preconfigured options for the UE to use for interpreting at least the second field.

Clause 12: The method of Clause 11, wherein the preconfigured rules are configured as part of at least one of a PDCCH search space configuration, a CORESET configuration, or a configurable DCI configuration.

Clause 13: The method of Clause 11, wherein the second field is associated with a scheduling parameter. In some aspects, the first field indicates a TCI state used to determine a value of the scheduling parameter.

Clause 14: The method of Clause 11, wherein the set of preconfigured options is applicable depending on at least one of: a frequency range, band, or subcarrier spacing used for communication between the UE and the network entity.

Clause 15: The method of any one of Clauses 9-14, wherein the DCI schedules downlink data or uplink data.

Clause 16: The method of any one of Clauses 9-15, wherein the DCI activates at least one of: a SPS downlink transmission, a CG uplink transmission, or a semi-persistent CSI report.

Clause 17: A processing system, comprising: a memory comprising computer-executable instructions; one or more processors configured to execute the computer-executable instructions and cause the processing system to perform a method in accordance with any one of Clauses 1-16.

Clause 18: A processing system, comprising means for performing a method in accordance with any one of Clauses 1-16.

Clause 19: A non-transitory computer-readable medium comprising computer-executable instructions that, when executed by one or more processors of a processing system, cause the processing system to perform a method in accordance with any one of Clauses 1-16.

Clause 20: A computer program product embodied on a computer-readable storage medium comprising code for performing a method in accordance with any one of Clauses 1-16.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as BS 180 (e.g., gNB) may operate in a traditional sub-6 GHz spectrum, in millimeter wave (mmWave) frequencies, and/or near mmWave frequencies in communication with the UE 104. When the BS 180 operates in mmWave or near mmWave frequencies, the BS 180 may be referred to as an mmWave base station.

The communication links 120 between BSs 102 and, for example, UEs 104, may be through one or more carriers. For example, BSs 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communication network 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a PSSCH, and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a PSSCH.

Transmit processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH DMRS, and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a RB, may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A, 3B, 3C, and 3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through RRC signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A, 3B, 3C, and 3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

A resource grid may be used to represent the frame structure. Each time slot includes a RB (also referred to as physical RBs (PRBs)) that extends 12 consecutive subcarriers. The resource grid is divided into multiple REs. The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of techniques for interpreting compact DCI in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the physical (PHY) layer. In the case of a user equipment (as in the example UE 104 of FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication by a user equipment (UE), comprising:
   receiving, from a network entity, downlink control information (DCI) that includes a first field that indicates:
   a transmission configuration indicator (TCI) state, and
   a preconfigured option for interpreting at least a second field associated with the DCI, wherein: the second field indicates a scheduling parameter; and a value of the scheduling parameter depends on the TCI state;
   interpreting at least the second field in accordance with the preconfigured option indicated by the first field; and
   communicating with the network entity in accordance with the interpretation of the second field.

2. The method of claim 1, wherein the DCI has a first DCI format that is compressed relative to a second DCI format in that at least one of:
   the second field has fewer bits in the first DCI format than in the second DCI format; or
   the second field is absent from the first DCI format.

3. The method of claim 1, further comprising:
   receiving radio resource control (RRC) signaling configuring the UE with a set of preconfigured options for interpreting at least the second field based on preconfigured rules, wherein the first field indicates one of the set of preconfigured options for the UE to use for interpreting at least the second field.

4. The method of claim 3, wherein the preconfigured rules are configured as part of at least one of a physical downlink control channel (PDCCH) search space configuration, a control resource set (CORESET) configuration, or a configurable DCI configuration.

5. The method of claim 3, wherein the set of preconfigured options is applicable depending on at least one of: a frequency range, band, or subcarrier spacing used for communication between the UE and the network entity.

6. The method of claim 1, wherein the DCI schedules downlink data or uplink data.

7. The method of claim 1, wherein the DCI activates at least one of: a semi-persistently scheduled (SPS) downlink transmission, a configured grant (CG) uplink transmission, or a semi-persistent channel state information (CSI) report.

8. A method for wireless communication by a network entity, comprising:

transmitting, to a user equipment (UE), downlink control information (DCI) that includes a first field that indicates:
a transmission configuration indicator (TCI) state, and
a preconfigured option for interpreting at least a second field associated with the DCI, wherein the second field indicates a scheduling parameter, and a value of the scheduling parameter depends on the TCI state; and
communicating with the UE in accordance with an interpretation of the second field in accordance with the preconfigured option indicated by the first field.

9. The method of claim 8, wherein the DCI has a first DCI format that is compressed relative to a second DCI format in that at least one of:
the second field has fewer bits in the first DCI format than in the second DCI format; or
the second field is absent from the first DCI format.

10. The method of claim 8, further comprising:
transmitting, to the UE, radio resource control (RRC) signaling configuring the UE with a set of preconfigured options for interpreting at least the second field based on preconfigured rules, wherein the first field indicates one of the set of preconfigured options for the UE to use for interpreting at least the second field.

11. The method of claim 10, wherein the preconfigured rules are configured as part of at least one of a physical downlink control channel (PDCCH) search space configuration, a control resource set (CORESET) configuration, or a configurable DCI configuration.

12. The method of claim 10, wherein the set of preconfigured options is applicable depending on at least one of: a frequency range, band, or subcarrier spacing used for communication between the UE and the network entity.

13. The method of claim 8, wherein the DCI schedules downlink data or uplink data.

14. The method of claim 8, wherein the DCI activates at least one of: a semi-persistently scheduled (SPS) downlink transmission, a configured grant (CG) uplink transmission, or a semi-persistent channel state information (CSI) report.

15. A user equipment (UE) configured for wireless communication, comprising:
at least one memory comprising computer-executable instructions; and
one or more processors, individually or collectively, configured to execute the computer-executable instructions and cause the UE to:
receive, from a network entity, downlink control information (DCI) that includes a first field that indicates:
a transmission configuration indicator (TCI) state, and
a preconfigured option for interpreting at least a second field associated with the DCI, wherein the second field indicates a scheduling parameter, and a value of the scheduling parameter depends on the TCI state;
interpret at least the second field in accordance with the preconfigured option indicated by the first field; and
communicate with the network entity in accordance with the interpretation of the second field.

16. The UE of claim 15, wherein the DCI has a first DCI format that is compressed relative to a second DCI format in that at least one of:
the second field has fewer bits in the first DCI format than in the second DCI format; or
the second field is absent from the first DCI format.

17. The UE of claim 15, wherein the one or more processors are configured to execute the computer-executable instructions and further cause the UE to:
receive radio resource control (RRC) signaling configuring the UE with a set of preconfigured options for interpreting at least the second field based on preconfigured rules, wherein the first field indicates one of the set of preconfigured options for the UE to use for interpreting at least the second field.

18. The UE of claim 17, wherein the preconfigured rules are configured as part of at least one of a physical downlink control channel (PDCCH) search space configuration, a control resource set (CORESET) configuration, or a configurable DCI configuration.

19. The UE of claim 17, wherein the set of preconfigured options is applicable depending on at least one of: a frequency range, band, or subcarrier spacing used for communication between the UE and the network entity.

20. The UE of claim 15, wherein the DCI schedules downlink data or uplink data.

21. The UE of claim 15, wherein the DCI activates at least one of: a semi-persistently scheduled (SPS) downlink transmission, a configured grant (CG) uplink transmission, or a semi-persistent channel state information (CSI) report.

22. A network entity configured for wireless communication, comprising:
at least one memory comprising computer-executable instructions; and
one or more processors, individually or collectively, configured to execute the computer-executable instructions and cause the network entity to:
transmit, to a user equipment (UE), downlink control information (DCI) that includes a first field that indicates:
a transmission configuration indicator (TCI) state, and
a preconfigured option for interpreting at least a second field associated with the DCI, wherein the second field indicates a scheduling parameter, and a value of the scheduling parameter depends on the TCI state; and
communicate with the UE in accordance with an interpretation of the second field in accordance with the preconfigured option indicated by the first field.

23. The network entity of claim 22, wherein the DCI has a first DCI format that is compressed relative to a second DCI format in that at least one of:
the second field has fewer bits in the first DCI format than in the second DCI format; or
the second field is absent from the first DCI format.

24. The network entity of claim 22, wherein the one or more processors are configured to execute the computer-executable instructions and further cause the network entity to:
transmit, to the UE, radio resource control (RRC) signaling configuring the UE with a set of preconfigured options for interpreting at least the second field based on preconfigured rules, wherein the first field indicates one of the set of preconfigured options for the UE to use for interpreting at least the second field.

25. The network entity of claim 24, wherein the preconfigured rules are configured as part of at least one of a physical downlink control channel (PDCCH) search space configuration, a control resource set (CORESET) configuration, or a configurable DCI configuration.

26. The network entity of claim 24, wherein the set of preconfigured options is applicable depending on at least one of: a frequency range, band, or subcarrier spacing used for communication between the UE and the network entity.

\* \* \* \* \*